United States Patent
Addeo et al.

(10) Patent No.: US 8,867,398 B2
(45) Date of Patent: Oct. 21, 2014

(54) METHOD OF ENABLING A PACKET LOSS MEASUREMENT IN A PACKET TRANSPORT NETWORK

(75) Inventors: Christian Addeo, Pordernone (IT); Italo Busi, Cerro Maggiore (IT); Gianluca Bobbo, Monza (IT)

(73) Assignee: Alcatel Lucent, Boulogne-Billancourt (FR)

( * ) Notice: Subject to any disclaimer, the term of this patent is extended or adjusted under 35 U.S.C. 154(b) by 40 days.

(21) Appl. No.: 13/812,936

(22) PCT Filed: Aug. 1, 2011

(86) PCT No.: PCT/EP2011/063211
§ 371 (c)(1),
(2), (4) Date: Jan. 29, 2013

(87) PCT Pub. No.: WO2012/031830
PCT Pub. Date: Mar. 15, 2012

(65) Prior Publication Data
US 2013/0215777 A1    Aug. 22, 2013

(30) Foreign Application Priority Data
Sep. 10, 2010   (EP) .................................... 10305975

(51) Int. Cl.
| | |
|---|---|
| G01R 31/08 | (2006.01) |
| H04L 12/935 | (2013.01) |
| H04L 12/26 | (2006.01) |
| H04L 12/70 | (2013.01) |

(52) U.S. Cl.
CPC ........ *H04L 43/0829* (2013.01); *H04L 49/3009* (2013.01); *H04L 2012/5624* (2013.01)
USPC ............ 370/252; 370/401; 370/392; 370/389

(58) Field of Classification Search
None
See application file for complete search history.

(56) References Cited

U.S. PATENT DOCUMENTS

| | | | |
|---|---|---|---|
| 6,188,674 | B1 | 2/2001 | Chen et al. |
| 8,085,675 | B2 * | 12/2011 | Hoque et al. .................. 370/249 |
| 2006/0227704 | A1 | 10/2006 | Nakagawa |
| 2007/0263535 | A1 * | 11/2007 | Shabtay ........................ 370/230 |
| 2008/0025309 | A1 * | 1/2008 | Swallow ....................... 370/392 |
| 2010/0050040 | A1 * | 2/2010 | Samuels et al. ............... 714/749 |

FOREIGN PATENT DOCUMENTS

| | | |
|---|---|---|
| EP | 1227624 | 7/2002 |
| EP | 2180636 | 4/2010 |

* cited by examiner

*Primary Examiner* — Duc C Ho
(74) *Attorney, Agent, or Firm* — Carmen Patti Law Group, LLC (57) ABSTRACT

Proposed is a method of enabling a packet loss measurement in a network. Via a group of user ports data packets containing a same source address and a same destination address are received. A link aggregation of the group of user ports is performed. At a network port, received data packets are transmitted to a far end network edge node. A number of transmitted data packets is determined, and also for each of the user ports a number of data packets lost internally is determined. At the network port, a corrected number of transmitted data packets is indicated to the far end network edge node as the sum of the determined number of transmitted data packets the overall number of data packets lost internally.

10 Claims, 8 Drawing Sheets

METHOD OF ENABLING A PACKET LOSS MEASUREMENT IN A PACKET TRANSPORT NETWORK

FIELD OF THE INVENTION

The invention relates to a method of packet loss measurement in a network.

BACKGROUND

When receiving at a network edge node a number of data packets and transmitting these data packets through a network to a far end network edge node, the number of data packets lost during this transmission can be determined for the purpose of performance monitoring. Already known is a protocol for packet loss measurement as proposed in the publication "ITU-T Recommendation Y.1731—OAM functions and mechanisms for Ethernet based networks, (February 2008)", briefly called Y.1731, which provides a method of packet loss measurement between two packet processors on which this protocol is implemented. Thus, two network edge nodes may determine the number of data packets lost during the transmission between their network ports, if at each of these network ports a packet processor running the protocol is provided. Therefore, a number of data packets lost between two clients, each connected to one of the network edge nodes, may be determined. It is an aim of the invention to improve the known method of packet loss measurement.

SUMMARY

Proposed is a method of enabling a packet loss measurement in a network. The method comprises different steps at a network edge node. At a group of user ports of the network edge node, data packets containing a same source address and a same destination address are received. A link aggregation of the group of user ports is performed, by adding at each user port to the received data packet an internal header element indicating the respective user port and a same network port, and by a switching device that switches the received data packets from the user ports to the network port using the added internal header elements. At the network port, the data packets are transmitted to a far end network edge node to which a client device identified by the destination address is connected.

At the network port, the number of the transmitted data packets is determined. Furthermore, for each of the user ports a respective number of data packets lost internally during the transmission from the respective user port to the network port is determined, using the added internal header elements. Furthermore, at the network port, a corrected number of transmitted data packets is determined using the determined numbers of data packets lost internally during the transmission from the respective user port to said network port. Then, the corrected number of transmitted data packets is indicated to the far end network edge node.

The corrected number of transmitted data packets is the sum of the determined number of the transmitted data packets and an overall number of data packets lost internally during the transmission from the user ports to the network port.

BRIEF DESCRIPTION OF THE DRAWINGS

FIGS. 7 a, b, c, d shows different steps of proposed methods for determining a corrected number of transmitted data packets.

DESCRIPTION OF EMBODIMENTS

The inventors have observed the following problem: Although packet processors located at the network ports of two network edge nodes may determine the number of data packets lost between these network ports, this determined number of lost data packets may not be the actual number of data packets lost between two clients connected to the network edge nodes. Additional packet loss may be caused, by a loss of data packets internally within a network edge node. For example, a hardware failure of sub devices of a network edge node may cause data packet loss. Furthermore, data packets may be lost due to the fact that packet processors of the network edge nodes store data packets within packet queues, which may drop data packets for the reason of queue congestion. Therefore, data packets lost internally within a network edge node should be taken into account.

Even furthermore, a client device may be connected to a network edge node not only via one single user port, but via multiple user ports forming a link aggregation group. Different sub-devices and different packet processors connecting the user ports of the link aggregation group and the network port of the network edge node may then cause data packet loss. Thus, if a protocol of packet loss measurement is running between one packet processor located at a network processor of a network edge nodes and another packet processor located at a network port of a far end network edge node, such a protocol will not take into consideration data packet loss caused internally between the group of user ports and the network port of the network edge node.

Even if one was to run separate protocols of packet loss measurement in parallel between each packet processor located at one of the user ports and the packet processor located at the network port of the far end network edge node, this would require a great amount of protocol message exchange between the two network edge nodes. Furthermore, this would require a coordination of the different parallel protocols at the far end network edge node. Even furthermore, the far end network edge node would have to take into account the number of user ports forming the link aggregation group, having to provide a separate protocol instance running for each user port of the link aggregation group.

That number of data packets, which are sent from one client device over user ports of a link aggregation group at a network edge node to another client device connected to a far end network edge node, and which are lost between the user ports of the link aggregation group and the network port of the far end network edge node, shall be determined for the purpose of performance monitoring.

The aim of the invention is to provide a method of packet loss measurement by means of direct protocol message exchange running between packet processors located at the network ports of the network edge nodes. Consideration of internal data packet loss between the user ports of the link aggregation group and the network port of the network node, to which the client sending the data packets is connected, shall require no modification of a protocol running at the network port of the far end network edge node. This is achieved by the proposed method explained in detail below.

Figure 1:
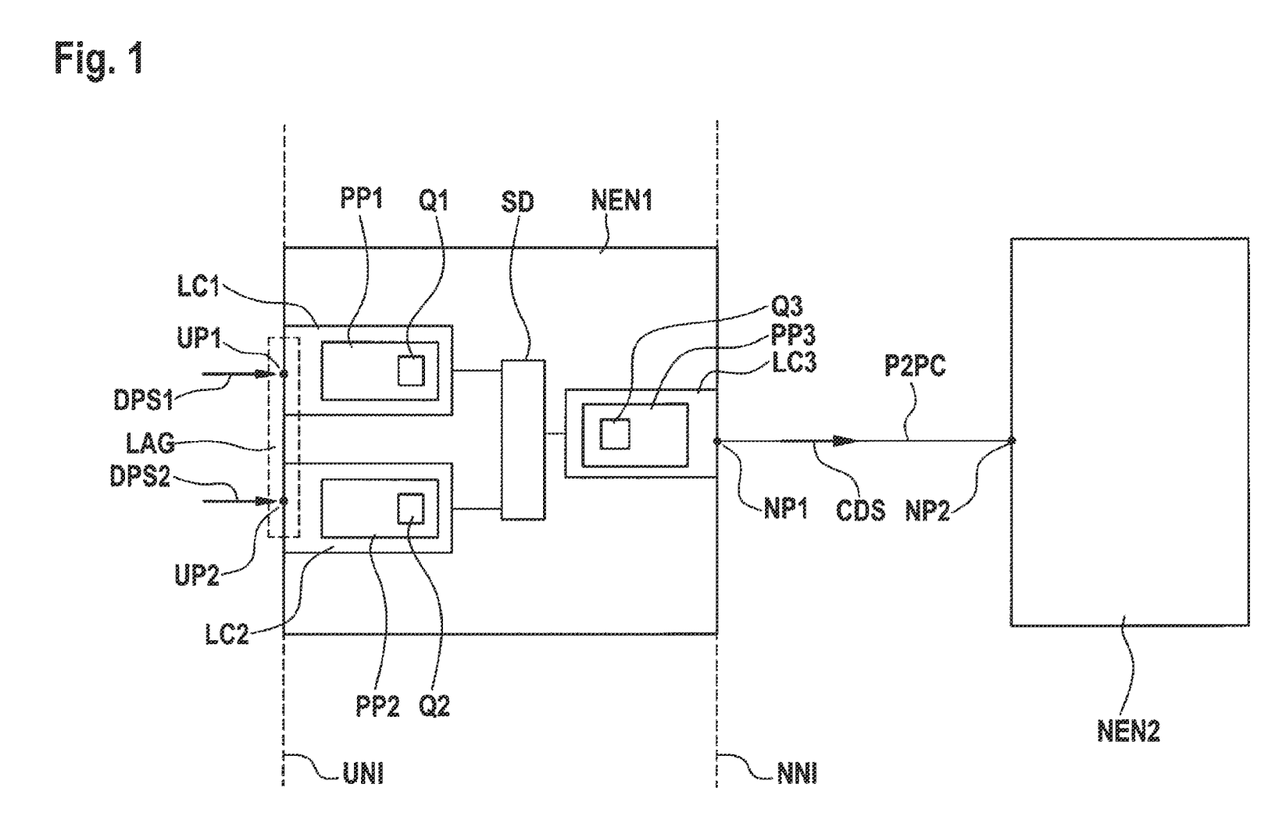
FIG. 1 shows two network nodes and different data packet streams according to an embodiment.

FIG. 1 shows a network edge node NEN1, which receives a number of data packet streams DPS1, DPS2 at a number of user ports UP1, UP2, representing a user network interface UN1. The data packets of the streams DPS1, DPS2 contain a same source address, identifying the client that sends the data packets, and a same destination address, identifying the client to which the data packets are addressed. Each user port UP1, UP2 is arranged on a line card LC1, LC2. Each user port UP1, UP2 is arranged on a separate line card LC1, LC2. Alternatively, multiple user ports may be arranged on a same line card.

Each line card LC1, LC2 contains a packet processor PP1, PP2, which handles the data packets of the received data packet stream DPS1, DPS2. The packet processors PP1, PP2 provide packet queues Q1, Q2 for temporarily storing data packets.

The line cards LC1, LC2 are connected to a switching device SD, preferably in the form of a switch fabric or several switching cards. Furthermore, a line card LC3 is connected to the switching device SD. The line card LC3 provides a network port NP1, representing a network-network interface NNI of the network edge node NEN1. Furthermore, the line card LC3 contains a packet processor PP3. The packet processor PP3 provides a packet queue Q3 for temporarily storing data packets. According to the example shown in FIG. 1, the network edge node NEN1 contains only one network port NP1, while in general a network edge node may contain multiple network ports.

The node NEN1 also contains a central control device CCD, which is connected to the line cards LC1, LC2, LC3 and to the switching device SD via an internal interface IIF. Via this interface IIF, the central control device CCD configures the packet processors LC1, LC2, LC3 and the switching device SD to perform a link aggregation of the user ports UP1, UP2 to a link aggregation group LAG.

A link aggregation of the user ports UP1, UP2 to the link aggregation group LAG is performed in the following manner. The packet processors UP1, UP2 add to each received data packet of the streams DPS1, DPS2 an internal header element that indicates that user port, at which the data packet was received, and also the network port NP1, to which the data packet shall be switched. Furthermore, the switching device SD considers the added internal header elements of a data packets, for switching the data packets to the network port NP1. This results in a combination of the data streams DPS1, DPS2 to a combined data stream CDS of data packets, which then is transmitted at the network port NP1 over a point-to-point connection P2PC to a far end network edge node NEN2. A point-to-point connection is a connection between two systems, or alternatively two network edge nodes, over a wide area network.

The packet processors PP1, PP3 determine in conjunction a number of data packets that are lost during the transmission of the data packet stream DPS1 from the user port UP1 to the network port NP1 in the following manner. The packet processor PP1 provides a counter determining the number of those data packets received from the client at the user port UP1, that contain the same source address and the same destination address, and to which an internal header element identifying the user port UP1 and the network port NP1 is added. The counter of the packet processor PP1 considers the received data packets before they are temporarily stored in the packet queue Q1. The packet processor PP3 provides a counter determining that number of data packets, which are received from the switching device SD and which contain the internal header element identifying the user port UP1. The packet processor PP3 removes the internal header elements from the data packets. The data packets are then transmitted at the network port NP1 to the far end network edge node NEN2. The counter of the packet processor PP3 considers the data packets after they are read out from the packet queue Q3 and before they are transmitted to the far end network edge node NEN2. The packet processor PP1 indicates the determined number of received data packets to the packet processor PP3. This indication is carried out, by the processor PP1 generating a data packet containing the number of received data packets. For obtaining a high measurement accuracy, the generated data packet is inserted behind that data packet, which was the last data packet contributing to the determined number of received data packets. Upon reception of the generated data packet, the packet processor PP3 determines the number of data packets lost internally during the transmission from the user port UP1 to the network port NP1, by subtracting the determined number of data packets, that were received from the switching device SD, from the number of received data packets indicated by the packet processor PP1.

In a similar manner as described above with respect to the packet processors PP1, PP3, the packet processors PP2, PP3 determine in conjunction a number of data packets lost during the transmission from the user port UP2 to the network port NP1.

Furthermore, at the network port NP1, the packet processor PP3 determines the number of data packets that are transmitted to the far end network edge node NEN2 and which contain the same source and destination address.

In order to indicate to the far end network edge node NEN2 that number of data packets, which were received at the user network interface UN1 from the client device identified by the source address, and that were intended for transmission to the client device connected to the far end network edge node NEN2, the packet processor PP3 determines a corrected number of transmitted data packets. This corrected number of transmitted data packets is the sum of the number of transmitted data packets determined by the packet processor PP3 at the network port NP1, and
the overall number of data packets lost internally between the user ports UP1, UP2 and the network port NP1.

The overall number of internally lost data packets is the sum of the data packets lost internally within the network edge node NEN1 during the internal transmission from the user ports UP1, UP2 to the network port NP1.

The network edge node NEN1 then indicates at the network port NP1 the corrected number of transmitted data packets to the far end network edge node NEN2.

The advantage of the proposed method is the following: A packet processor located at the network port NP2 of the far end network edge node NEN2 may determine the number of received data packets, which contain the above mentioned same source address and same destination address, and then compare this determined number of received data packets with the indicated corrected number of transmitted data packets, for determining the actual number of data packets lost during the transmission from the user ports UP1, UP2 to the network port NP2. For doing so, the packet processor located at the network port NP2 only has to exchange protocol messages with the packet processor PP3 located at the network port NP1. The packet processor located at the network port NP2 does neither have to consider the number of user ports UP1, UP2 forming the link aggregation group LAG, nor does it have to determine itself the number of data packets lost between the individual user ports UP1, UP2 of the group LAG and the network port NP1. Therefore, the packet processor located at the network port NP2 may simply implement a known protocol of packet loss measurement as defined in Y.1731 for determining the actual number of data packets lost during the transmission from the user ports UP1, UP2 to the network port NP2, while a loss of data packets occurring between the user ports of the group LAG and the network port NP1 is compensated for by the packet processor PP3 located at the network port NP1. This also has the advantage, that an addition of a user port to the link aggregation group LAG or a removal of a user port from the link aggregation group LAG does only have to be considered at the packet processors PP1, PP2, PP3 of the network edge node NEN1, but not by the packet processor located at the network port NP2. Even furthermore, the proposed method does not demand an implementation of a packet loss measurement protocol between each packet processor PP1, PP2 at the user ports UP1, UP2 and the packet processor located at the network port NP2. Thus, the amount of protocol message exchange between the nodes NEN1, NEN2 is not affected by the proposed method.

The indication of the determined actual number of lost data packets is carried out, by the packet processor PP3 generating a data packet carrying a data element indicating the corrected number of transmitted packets. This generated data packet is then sent over the point-to-point connection P2PC to the network edge node NEN2. For obtaining a high measurement accuracy, the packet processor located at the network port NP2 determines the number of received data packets at that time instance, at which the generated data packet is received at the network port NP2. The generated data packet itself is not taken into consideration for the determination of the number of received data packets.

Alternatively, the node NEN2 may indicate the number of data packets received at the network port NP2 to the node NEN1, which then itself may determine the actual number of data packets lost between the user ports of the group LAG and the network port NP2. An indication of the number of data packets received at the network port NP2 is carried out, by the packet processor located at the network port NP2 generating a data packet carrying a data element indicating the number of data packets received at the network port NP2. This generated data packet is then sent over the point-to-point connection P2PC to the network edge node NEN1. According to a further alternative, the network edge node NEN2 may include into this generated data packet also the previously received and indicated corrected number of data packets, for indicating to the network edge node NEN1, which number of received data packet corresponds to which corrected number of transmitted data packets. This has the advantage, that the network edge node NEN1 does not have to correlate on its own, which corrected number of transmitted packets corresponds to which number of received data packets.

Figure 2:
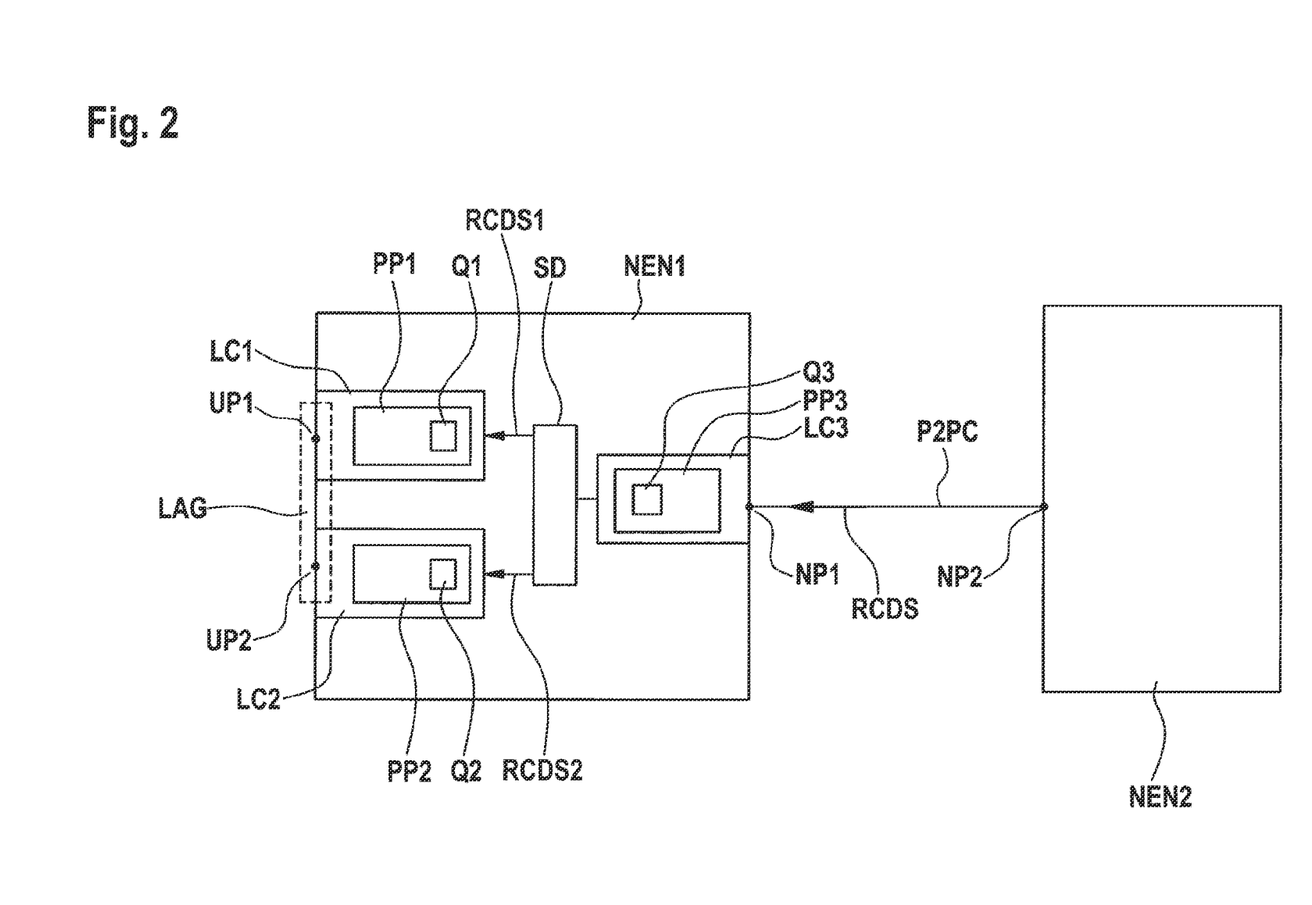
FIG. 2 shows two edge network nodes and different data packet streams according to a further embodiment.

FIG. 2 shows the nodes NEN1, NEN2 with all sub devices, user ports and network ports as already described according to FIG. 1. Furthermore, FIG. 2 shows data packets of a reverse combined data packet stream RCDS, which is sent by the network node NEN2 via the network port NP2 to the network node NEN1, and which is received at the network port NP1. The data packets of the data stream RCDS contain a destination address equal to the source address of the data packets of the data streams DPS1, DPS2 shown in FIG. 1. Furthermore, the data packets of the data stream RCDS contain a source address equal to the destination address of the data packets of the data streams DPS1, DPS2 shown in FIG. 1.

The number of data packets lost between the previously mentioned clients shall be measured for a transmission direction opposite to the transmission direction previously considered in FIG. 1.

At the network port NP1, the number of received data packets is determined by the packet processor PP3.

Furthermore, link aggregation of the group of user ports UP1, UP2 is carried out for data packet transmission from the node NEN1 to the client device connected to the user ports of the link aggregation group LAG. To the received data packets, an internal header element identifying one of the user ports UP1, UP2 of the group LAG is added. The user port identified by the internal header element may be chosen due to a load balancing principle known as round robin, or alternatively, by computing a hash function over the data content of the data packet and then choosing a user port in dependence on the resulting hash value. The switching device SD then switches the received data packets from the network port NP1 to the user port, identified by the internal header element. This results in a splitting of the data stream RCDS into partial data streams RCDS1, RCDS2. At the user ports UP1, UP2, the data packets are transmitted to the client device.

It is determined for each user port UP1, UP2 of the link aggregation group LAG, how many data packets have been lost internally during the transmission from the network port NP1 to the respective user port UP1, UP2. For the user port UP1, this determination is carried out by the packet processor PP1 in conjunction with the packet processor PP3. For the user port UP2, this determination is carried out by the packet processor PP2 in conjunction with packet processor PP3.

The packet processor PP3 provides a counter determining the number of those data packets, that are received at the network port NP1, and that belong to the data stream RCDS. To these data packets, an internal header element identifying one of the user port UP1, UP2 of the group LAG and the network port NP1 is added. The counter of the packet processor PP3 considers the received data packets before they are temporarily stored in the packet queue Q3. Furthermore, the processor PP3 provides a counter determining the number of data packets, that are assigned an internal header element identifying the user port UP1 and the network port NP1.

The packet processor PP1 provides a counter determining that number of data packets, which are received from the switching device SD and which contain the internal header element identifying the user port UP1 and the network port NP1. The packet processor PP1 removes the internal header element from the data packets. The data packets are then transmitted at the user port UP1 to the client device. The counter of the packet processor PP1 considers the data packets after they are read out from the packet queue Q1 and before they are transmitted to the client device. The packet processor PP3 indicates the number of data packets, that were assigned an internal header element identifying the user port UP1 and the network port NP1, to the packet processor PP1. This indication is carried out, by the processor PP3 generating a data packet containing this number. For obtaining a high measurement accuracy, the generated data packet is inserted behind that data packet, which was the last data packet contributing to the determined number of data packets assigned to the user port UP1. The packet processor PP1 determines the number of received data packets at that time instance, at which the generated data packet is received.

The packet processor PP1 itself determines the number of data packets lost internally during the transmission from the network port NP1 to the user port UP1, by subtracting the determined number of data packets, that were received from the switching device SD, from the number of data packets indicated by the packet processor PP3. This determined number of internally lost data packets is then indicated by the processor PP1 to the processor PP3, by generating a further data packet containing the determined number of internally lost data packets, and inserting this data packet into the packet transmission directed from the user port UP1 to the network port NP1, as shown in FIG. 1. Alternatively, the packet processor PP1 may generate and insert a data packet containing the determined number of data packets, that were received at the port UP1 from the switching device SD, and the indicated number of data packets previously indicated by the packet processor PP3. Upon reception of this data packet, the processor PP3 may determine the number of data packets lost internally during the transmission from the network port NP1 to the user port UP1.

In a similar manner as described above with respect to the packet processors PP1, PP3, the packet processors PP2, PP3 determine in conjunction a number of data packets lost during the transmission from the network port NP1 to the user port UP2.

At the network port NP1, a corrected number of received data packets is determined, by subtracting from the previously determined number of received data packets the overall number of data packets lost internally during the transmission of the data packets from the network port NP1 to the user ports UP1, UP2. The overall number of data packets lost internally is determined as the sum of data packets lost during the transmission from the network port NP1 to the respective user ports UP1, UP2 of the link aggregation group LAG.

A network processor located at the network port NP2 of the far end network node NEN2 determines the number of data packets, that contain the previously mentioned source address and destination address, and that are transmitted at the network port NP2 over the point-to-point connection P2PC to the network port NP1 of the node NEN1.

The packet processor located at the network port NP2 indicates the number of transmitted data packets to the network port NP1, using a generated data packet. The packet processor PP3 then determines the actual number of data packets lost during the transmission from the network port NP2 to the user ports UP1, UP2, by subtracting the corrected number of received data packets from the indicated number of transmitted data packets. Alternatively, the processor PP3 indicates the corrected number of received data packets to the network port NP2, using a generated data packet. Then, the packet processor located at the network port NP2 determines the actual number of data packets lost during the transmission from the network port NP2 to the user ports UP1, UP2, by subtracting the indicated corrected number of received data packets from the determined number of transmitted data packets.

Figure 3:
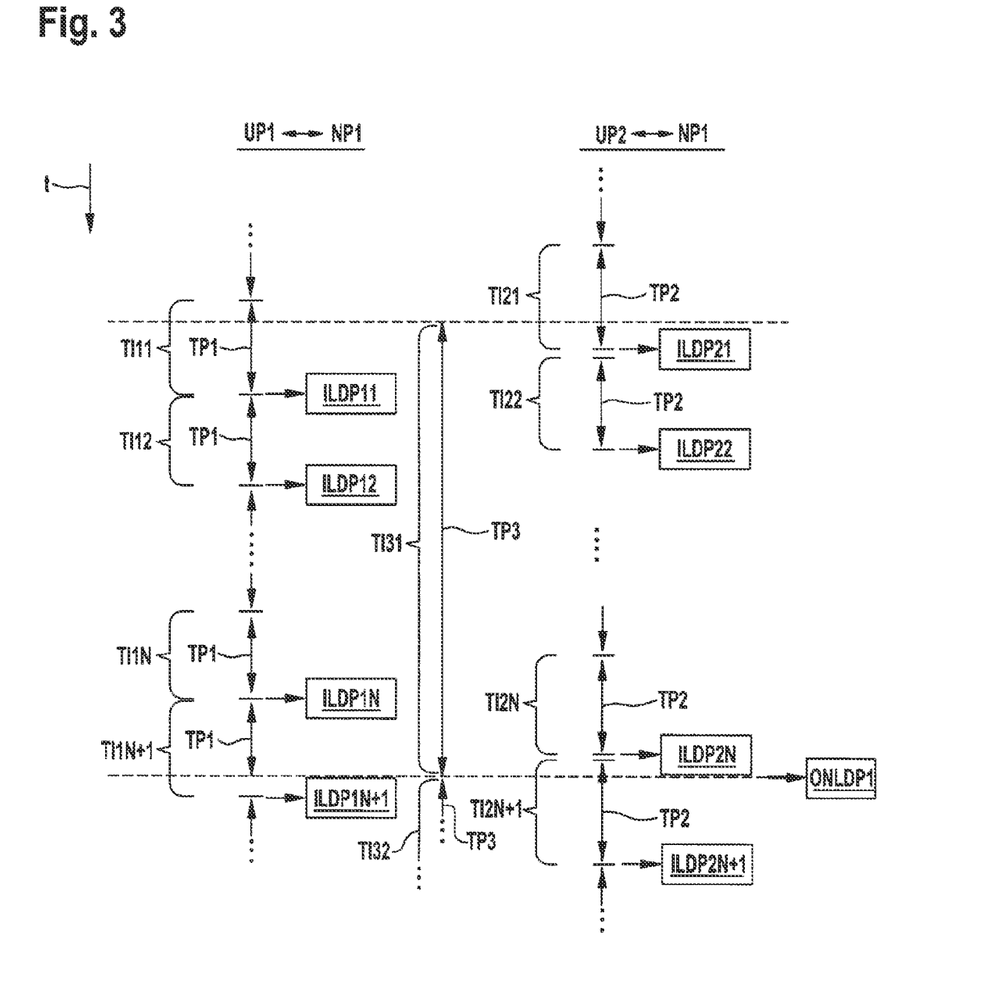
FIG. 3 shows different steps of a method of determining an overall number of data packets lost during consecutive time intervals according to an embodiment.

FIG. 3 shows different steps of the method of determining an overall number of data packets lost internally during the transmission of data streams from the user ports UP1, UP2 to the network port NP1, according to an alternative solution. For each of the user ports UP1, UP2, a respective number of data packets lost internally between the respective user port UP1, UP2 and the network port NP1 is determined at a respective periodicity. For the user port UP1, the number of data packets lost internally is determined at a periodicity that is reciprocal to a time period TP1. For each time interval TI11, TI12, . . . , TI1N, TI1N+1, a number of internally lost data packets ILDP11, ILDP12, . . . , ILDP1N, ILDP1N+1 is determined at the end of the respective time interval. For the user port UP2, the number of data packets lost internally is determined at a periodicity that is reciprocal to a time period TP2. For each time interval TI21, TI22, . . . , TI2N, TI2N+1, a number of internally lost data packets ILDP21, ILDP22, . . . , ILDP2N, ILDP2N+1 is determined at the end of the respective time interval.

The overall number ONLDP1 of data packets lost internally is determined at an overall periodicity that is reciprocal to a time period TP3. For an overall time interval TI31, the overall number of data packets lost internally is determined, by summing those respective numbers ILDP11, ILDP12, . . . , ILDP1N, ILDP21, ILDP22, . . . , ILDP2N of internally lost data packet, that have been determined during the overall time interval TI31.

The time periods TP1, TP2 do not have to be equal, but may differ. This has the advantage, that no exact synchronization between the different involved packet processors residing at the user ports UP1, UP2 is necessary.

The advantage of this alternative solution is, that the determination of the respective number of internally lost data packets for the respective user ports on the one hand, and the overall number of internally lost data packets on the other hand, can be performed at periodicities which are not equal. Furthermore, the determination of data packs lost internally between the user port UP1 and the network port NP1 can be carried out at time instances, which are not equal to the time instances, at which the number of data packets lost internally between the user port UP2 and the network port NP1 are determined. Therefore, no synchronisation between the packet processors residing at the user ports UP1, UP2 and the network port NP1 is necessary for enabling the determination of the overall number of internally lost data packets.

Although a number of data packets lost during the time interval TE1N+1 is not accounted for within the overall time interval TI31, this amount of lost data packets will be accounted for in the next overall time interval TI32. The same applies to the number of data packets lost during the beginning of the time interval TI2N+1, which will contribute to the number of lost data packets ILDP2N+1 and thus also contribute to the overall number of lost data packets determined for the overall time interval TI32.

The overall numbers of internally lost data packets for respective consecutive time intervals TI31, TI32 are then used, to determine respective corrected numbers of transmitted data packets, and furthermore respective actual numbers of lost data packets. The determined respective actual numbers of lost data packets are then accumulated and/or averaged over the consecutive time intervals TI31, TI32 for the purpose of performance monitoring.

With reference to FIG. 3, a method for determining an overall number of data packets lost internally between the user ports UP1, UP2 and the network port NP1 has been described and proposed. With regard to this method, it is possible to determine in a similar manner for each of the user ports a respective number of data packets lost internally between the network port NP1 and the respective user ports UP1, UP2 during a transmission of data packets from the network port NP1 to the user ports UP1, UP2 at respective periodicities. Thus, it is also possible to determine the overall number of data packets lost internally between the network port NP1 and the user ports UP1, UP2 at an overall periodicity. This is achieved without having to synchronise the packet processors residing at the user ports UP1, UP2 and the network port NP1. Furthermore, the overall number of data packets lost internally between the network port NP1 and the user ports UP1, UP2 can then be determined for consecutive overall time intervals, leading to actual numbers of data packets lost during the respective overall time intervals. These actual numbers of data packets can then be accumulated and/or averaged over consecutive overall time intervals for the purpose of performance monitoring.

Figure 4:
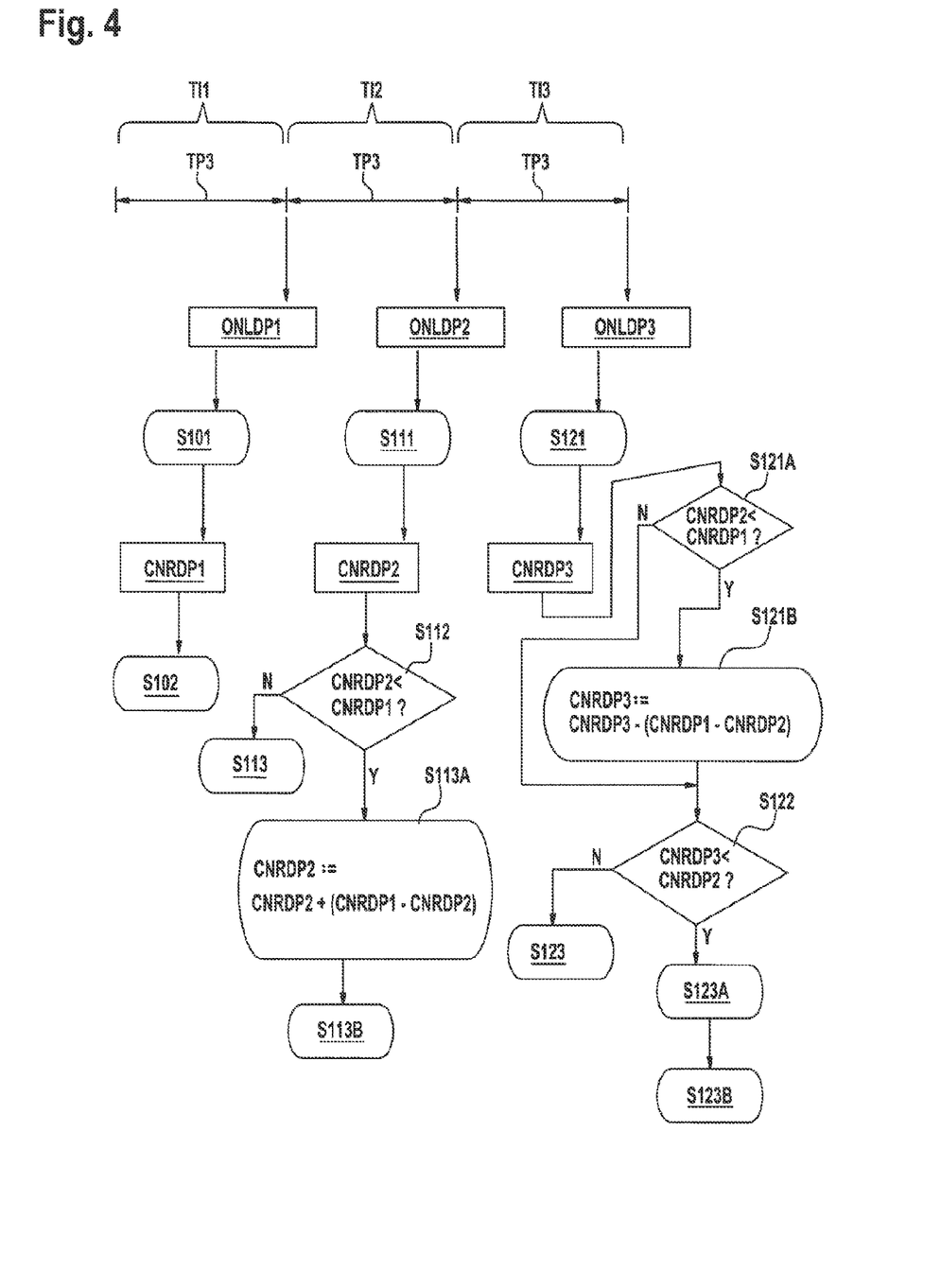
FIG. 4 shows different steps of a method of determining a corrected number of received data packets.

According to FIG. 4, steps of the method for determining a corrected number of transmitted data packets according to a further alternative solution are proposed. For a number of consecutive overall time intervals TI31, TI32, TI33, respective overall numbers of internally lost data packets ONLDP1, ONLDP2, ONLDP3 are determined, as it has been described in detail above with regard to FIG. 3. Within the steps S101, S111, S121 respective corrected numbers of received data packets CNRDP1, CNRDP2, CNRDP3 are determined based on the respective overall numbers of internally lost data packets ONLDP1, ONLDP2, ONLDP3. The corrected number of received data packets CNRDP1 is indicated to the far end network edge node within step S102.

As it has been previously explained, data packets lost internally during the time interval TI1N+1, shown in FIG. 3, are not taken into account within the overall number of internally lost data packets ONLDP1 of the overall time interval TI31, but within the overall number of internally lost data packets ONLDP of the overall time interval TI32. Thus, there is a theoretical chance, that the resulting corrected number of received data packets CNRDP2 may be smaller than the corrected number of transmitted data packets CNRDP1. This means, that the far end network node would receive at a first time instance an indication of the number CNRDP1 as a number of data packets received at the network port NP1, and at a later time instance an indication of the number CNRDP2 as number of data packets received at the network port NP1, wherein this number is smaller than that of the previous time instance. Thus, the far end network node would be indicated, that from one time instance to a next time instance the number of data packets received at the network port actually decreased, which would not make sense from the point of view of the far end network node in the case that the corrected number of received data packets shall represent a progressional number of received data packets monotonically increasing from one time interval TI31 to another time interval TI32.

Therefore, it is ensured that the indicated corrected number of received data packets does not decrease between consecutive time intervals TI31, TI32. Within the step S112, it is checked whether the corrected number of received data packets CNRDP2 for the current overall time interval TI32 is smaller than the corrected number of received data packets CNRDP1 of the previous overall time interval TI31.

In the case, that the corrected number of received data packets CNRDP2 is not smaller than the corrected number of received data packets CNRDP1, the method advances to the step S113. Within the step S113, the corrected number of received data packets CNRDP2 is indicated to the far end network edge node.

In the case, that the corrected number of received data packets CNRDP2 is smaller than the corrected number of received data packets CNRDP1, the method advances to the step S113A. Within the step S113A, the corrected number of received data packets CNRDP2 is increased by a number, which is equal to or greater than the difference between the corrected number of received data packets CNRDP1 and the corrected number of received data packets CNRDP2. Furthermore, within the following step S113B, the adjusted corrected number of received data packets is indicated to the far end network node.

Within the step S121, the corrected number of received data packets CNRDP3 of the overall time interval TI33 is determined. Within the step S121A, it is checked, whether the corrected number of received data packets CNRDP2 was smaller than the corrected number of received data packets CNRDP1. If this is the case, the corrected number of received data packets CNRDP3 is decreased within the step S121B by the same number, by which the corrected number of received data packets CNRDP2 had been increased within the step S113A. Furthermore, the steps S122, S123, S123A, S123B similar to the steps S112, S113, S113A, S113B are carried out, for ensuring, that the indicated corrected number of received packets does not decrease between consecutive time intervals.

Alternatively, the corrected number of data packets may represent an individual number of received data packets for each individual overall time interval TI31, TI32. In the case, that accounting for an overall number of internally lost data packets determined for one time interval TI32 would result in a negative corrected number of received data packets for that time interval TI32, then at least a fraction of the overall number of internally lost data packets is shifted to a next consecutive time interval TI33, by taking into account this fraction when determining the corrected number of received data packets for that next consecutive time interval TI33. By this it is achieved, that an indicated corrected number of data packets does not take a negative value, which would not make sense from the point of view of the far end network edge node.

Figure 5:
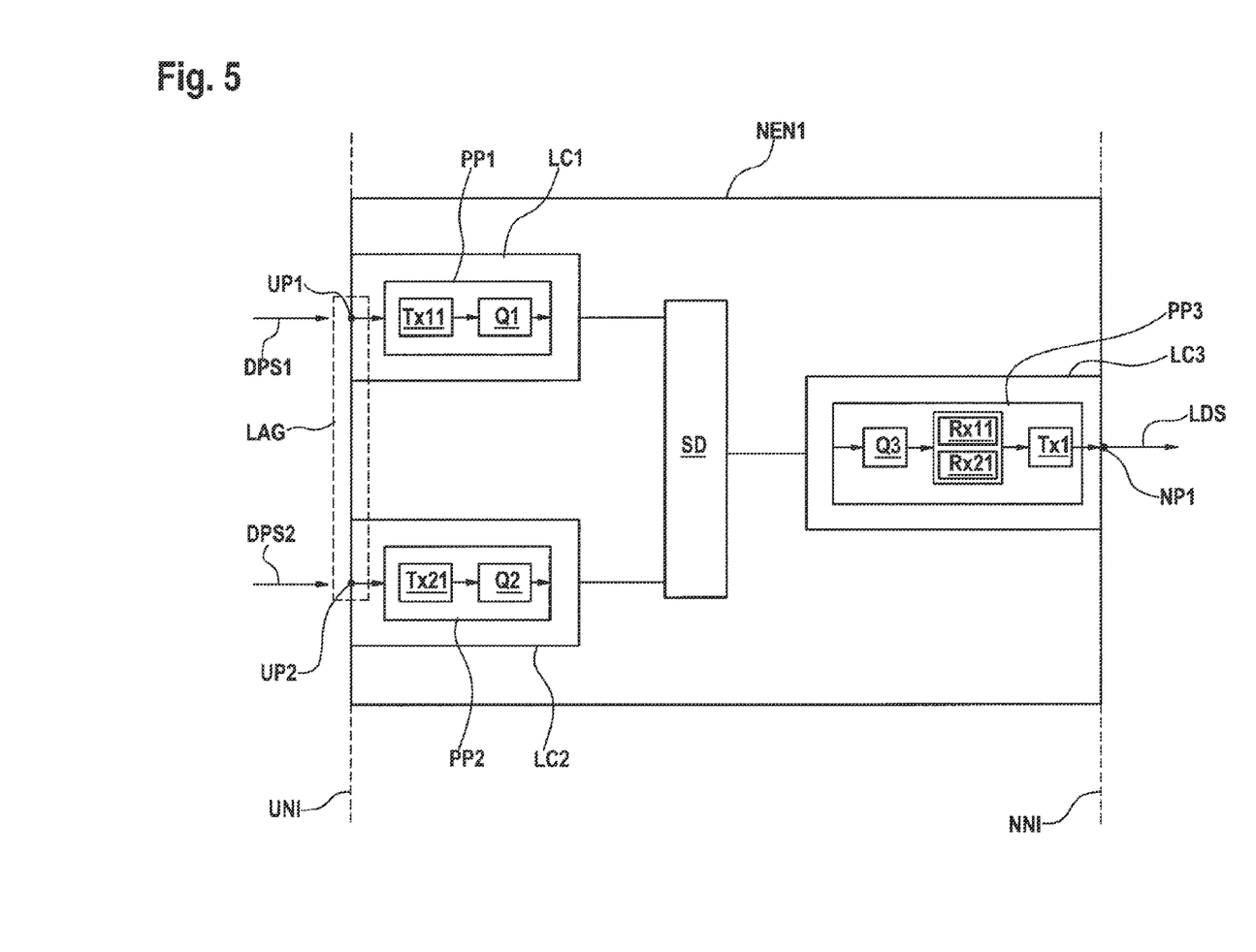
FIG. 5 shows a network edge node device according to an embodiment.

FIG. 5 shows the network node NEN1 together with its sub devices as already explained according to FIG. 1. At the packet processor PP1 of the line card LC1, a transmission counter TX11 is provided. The transmission counters TX11, TX21 count the respective numbers of data packets received from the client device at the respective user port UP1, UP2. At the packet processor PP3 of the line card LC3, a reception counter RX11 is provided, which counts the number of data packets that are received at the network port NP1 from the user port UP1. Furthermore, a reception counter RX21 is provided at the packet processor PP3, which counts the number of data packets received at the network port NP1 from the user port UP2.

A transmission counter TX1 is provided at the packet processor PP3. This transmission counter TX1 counts the number of data packets transmitted at the network port NP1 to the far end network edge node. The determination of the overall number of data packets lost internally within the network node NEN1 is carried out, by using sample values of the counters TX11, TX21, RX11, RX21. In other words, the number of internally lost data packets is determined using transmission and reception counters observing the numbers of data packets of the partial data streams DPS1, DPS2 received at user port UP1, UP2.

The packet processors PP1, PP2, PP3 provide respective packet queues Q1, Q2, Q3 for storing received data packets in these queues, before forwarding them. The transmission counters TX11, TX21 and the reception counters RX11, RX21 are located such, that any of the packet queues Q1, Q2, Q3 are located between the counters TX11, TX21, RX11, RX21. This has the effect that, the counters TX11, TX21, Rx21, Rx1 are able to take into account a loss of data packets caused by any of the queues Q1, Q2, Q3.

At a certain time instance, the transmission counter TX11 is sampled by the packet processor PP1. The packet processor PP1 then generates a data packet with the sampled value of the transmission counter and inserts this generated data packet into the data stream DPS1.

At another time instance, the packet processor PP2 samples a value of the transmission counter TX21, and generates a data packet containing the sampled value of the transmission counter TX21. This generated data packet is then inserted into the data stream DPS2.

Furthermore, the packet processors PP1, PP2 add to the data packets, which are received and admitted at the respective user port UP1, UP2, internal header information as previously mentioned.

At the packet processor PP3, the number of data packets that are received from the user port UP1 are counted by the reception counter RX11, by considering the internal header elements of the data packets. Upon reception at the packet processor PP3 of the data packet carrying the sample value of the transmission counter TX11, the reception counter RX11 is sampled. The generated data packet itself is not taken into consideration by the reception counter RX11. The number of data packets lost internally between the user port UP1 and the network port NP1 is then determined as the difference between the sample value of the transmission counter TX11 and the sample value of the reception counter RX11.

In a similar manner, the packet processor PP2 and packet processor PP3 carry out a determination of the data packets lost internally between the ports UP2 and NP1, relying on sample values of the counters TX21 and RX21.

As a next step, the packet processor PP3 samples a value of the transmission counter TX1. In order to indicate to the far end network edge node that number of data packets, which has been received via the user ports UP1, UP2 of the link aggregation group LAG, the sample value of the transmission counter TX1 is increased by the overall number of data packets lost internally within the network edge node NEN1 between the user ports UP1, UP2 and the network port NP1.

This overall number of data packets lost internally is determined as the sum of the data packets lost between the different user ports UP1, UP2 and the network port NP1.

The corrected number of data packets transmitted from the network node NEN1 to the far end network edge node is determined as the sum of the sample value of the counter TX1 and the overall number of data packets lost internally. This corrected number is then indicated to the far end network edge node at the network port NP1.

Alternatively, the transmission counter itself can be first increased by the overall number of data packets lost internally, and then sampled to obtain the sample value of the transmission counter TX1. Then, this sampled value is indicated via the network port NP1 to the far end network edge node.

Figure 6:
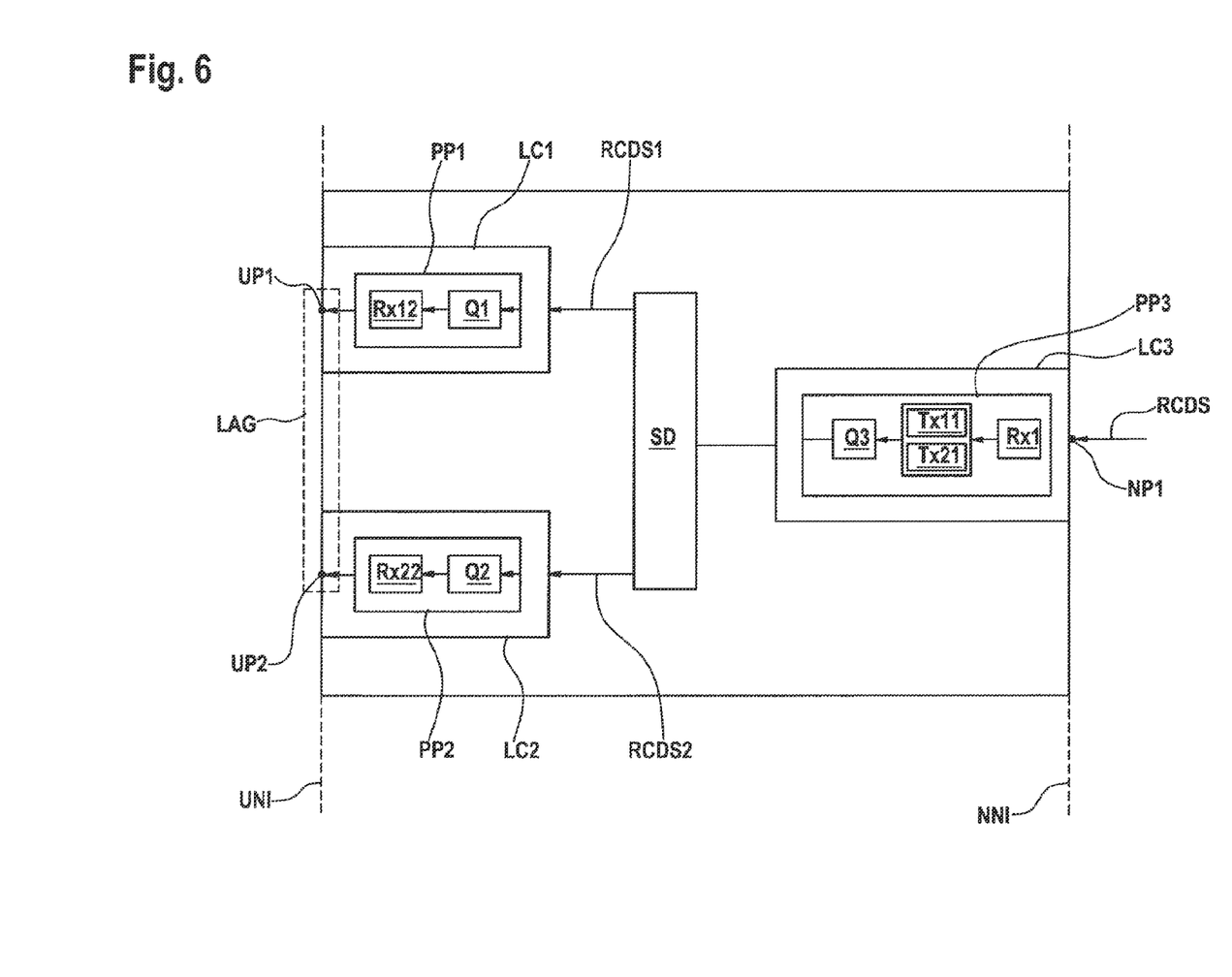
FIG. 6 shows a network edge node device according to a further embodiment.

FIG. 6 shows the network edge node NEN1 with all sub elements and counter as already described with reference to FIG. 2. Furthermore, FIG. 6 shows a reception counter RX1 provided by the packet processor PP3 at the network port NP1. This reception counter RX1 counts the number of data packet that are received at the network port NP1 via the reverse combined data stream RCDS from the far end network edge node. The packet processor PP3 distributes the data packets of the reverse combined data stream RCDS to the user ports UP1, UP2 of the link aggregation group LAG as previously described with reference to FIG. 2.

At the packet processor PP3, a transmission counter TX12 is provided, which counts the number of data packets to be transmitted from the network port NP1 to the user port UP1. Furthermore, the packet processor PP3 provides a transmission counter TX22, which counts the number of data packets to be transmitted from the network port NP1 to the user port UP2. The transmission counters TX12, TX22 analyse the internal header information of the data packet, for determining whether they have to take into account a data packet.

At the packet processor PP1, a reception counter RX12 is provided, which counts the number of data packets that are received via the reverse data packet streams RCDS1. At the packet processor PP2, a reception counter RX22 is provided, which counts the number of data packets received via the reverse data packet stream RCDS2.

Using sample values of the transmission counters TX12, TX22 and the reception counters RX12, RX22, a number of data packets lost internally during the transmission from the network port NP1 to the user ports UP1, UP2 is determined in a manner similar to the determination of internally lost data packets during the transmission from the user ports UP1, UP2 to the network port NP1, as previously described with reference to FIG. 3.

At the network port NP1, the reception counter RX1 is decreased by the overall number of data packets lost internally. This overall number of internally lost data packets is the sum of the data packets lost during the transmission of data packets from the network port NP1 to the user ports UP1, UP2.

Figure 7:
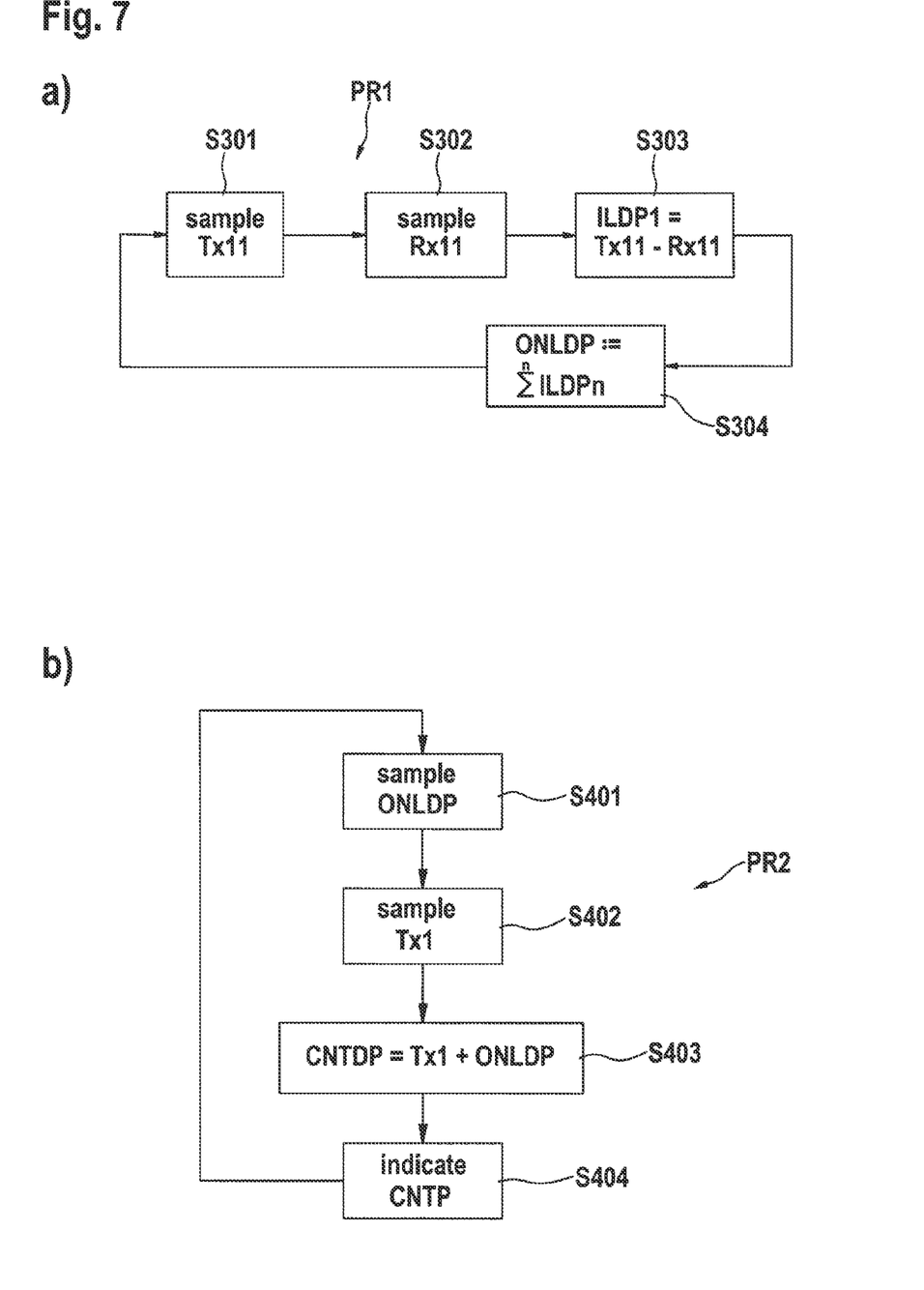

FIG. 7 shows different alternative solutions for determining a corrected number of transmitted data packets.

FIG. 7a shows a process PR1 for taking into account a number of data packets lost between a user port and a network port. The shown process PR1 is illustrated with regard to the user port UP1 and the transmission counters TX11 and RX11 previously shown in FIG. 3. It is clear for a person skilled in the art, that the process PR1 shown in FIG. 7a with the respective counters TX11 RX11 can be carried out for other user ports, using the corresponding transmission counters and reception counters.

According to FIG. 7a, the transmission counter TX11 is sampled within a step S301. Furthermore, the sampled value of the counter TX11 is inserted into a generated data packet, which then is received at a packet processor that provides the reception counter RX11. Upon the reception of the data packet carrying the sample value of the transmission counter TX11, the reception counter RX11 is sampled within the step S302. As a next step S303, the number ILDP1 of data packets lost internally between the user port and the network port is determined as the difference of the sample values of the transmission counter TX11 and the reception counter Rx11. As a next step S304, the counter ONLDP counting the overall number of lost data packets is increased by the previously determined number of internally lost data packets ILDP1. After this step S304, the process PR1 returns to the step S301.

Carrying out a process similar to the process PR1 for determining the data packets lost between the different user ports of the link aggregation group and the network port, and increasing the counter ONLDP by each number of internally lost data packets, it is possible to count via the counter ONLDP the overall number of data packets lost internally between all user ports of the link aggregation group and the network port.

FIG. 7b shows a process PR2 for determining and indicating a corrected number of transmitted data packets CNTDP. In a step S401, the counter ONLDP is sampled. Within a step S402, the transmission counter TX1 is sampled. Within a step S403, the corrected number of transmitted data packets CNTDP is determined, by increasing the sampled value of the transmission counter TX1 by the overall number of lost data packets ONLDP. As a next step S404, the corrected number of transmitted data packets CNDTP is indicated via the network port to the network edge node.

According to the solution illustrated by the FIGS. 7a and 7b, the overall number of lost data packets is determined by the counter ONLDP, which continually increases.

FIGS. 7c and d show processes PR1' and PR2', as an alternative solution to the processes PR1 and PR2 shown on FIGS. 7a and b.

The process PR1' for determining the overall number of lost data packets ONLDP contains all steps as previously described according to FIG. 7a. Furthermore, the process PR1' contains a step S305, which follows step S304. Within the step S305, the receiving counter RX11 is increased by the determined number of internally lost data packets ILDP1. After the step S305, the process PR1' returns to the step S301.

FIG. 7d shows the process PR2' for determining the corrected number of transmitted data packets according to the alternative solution. The process PR2' contains all steps of the process PR2 already previously described according to FIG. 7b. Furthermore, the process PR2' contains a step S405, which follows the step S404. Within this step S405, the transmission counter TX1 is increased by the overall number of lost data packets ONLDP. As a next step S406, the counter ONLDP counting the overall number of lost data packets is reset to zero. After the step S406, the process PR2' returns to the step S401.

Alternatively, after sampling the counter ONLDP within the step S401, the transmission counter TX1 is directly increased by the overall number of lost data packets ONLDP, and this sampled value is used as the corrected number of transmitted data packets. Furthermore, the counter ONLDP is reset to zero.

The solutions described according to the FIGS. 7c and d are solutions in which the counter ONLDP counting the overall number of lost data packets is reset to zero. Through this, it is achieved, that the process PR2' avoids a situation, in which the counter ONLDP increments to infinity. Therefore, the alternative solution according to the FIGS. 7c and d is a solution, in which the counter ONLDP may be implemented by a finite number of bits representing the counter ONLDP.

According to a preferred embodiment, the packet processors are provided in the form of Field Programmable Gate Arrays (FPGA). The line cards and the switching device are connected via a backpanel traffic interface.

The functions of the various elements shown in the FIGS. 1, 2, 5 and 6, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. 1, 2, 5 and 6 are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. Method of enabling a packet loss measurement in a network, the method comprising:
  receiving at a group of user ports data packets containing a same source address and a same destination address;
  performing a link aggregation of said group of user ports, by,
    at each user port of said group, adding to each data packet received at a respective user port an internal header element indicating said respective user port and a same network port, and,
    at a switching device, switching said received data packets from said user ports to said same network port using the added internal header elements;
  at said network port,
    transmitting said data packets to a far end network edge node, and
    determining a number of said transmitted data packets;
  determining for each of said user ports a respective number of data packets lost internally during the transmission from the respective user port to said network port using said added internal header elements;
  determining a corrected number of transmitted data packets using said determined numbers of data packets lost internally during the transmission from the respective user port to said network port, wherein said corrected number of transmitted data packets is the sum of the determined number of said transmitted data packets and an overall number data packets lost internally during the transmission from said user ports to said network port; and
  indicating at said network port said corrected number of transmitted data packets to said far end network edge node.

2. Method according to claim 1, furthermore comprising:
  at said network port,
    receiving second data packets containing a second source address equal to said first destination address and a second destination address equal to said first source address, and
    determining a second number of said received second data packets;
  performing a link aggregation of said user ports, by,
    at said network port, adding to each of said received second data packets an internal header element indicating one of said user ports, and,
    at said switching device, switching said received second data packets to one of said user ports using said added internal header elements;
  determining for each of said user ports a respective number of second data packets lost internally during the transmission from said network port to the respective user port; and
  determining a corrected number of received second data packets using said determined numbers of second data packets lost internally during the transmission from said network port to the respective user port.

3. Method according to claim 2, furthermore comprising:
  determining for each of said user ports said respective number of second data packets lost internally during the transmission from said network port to the respective user port at a respective periodicity; and determining the overall number of second data packets lost internally during the transmission from said network port to said user ports at an overall periodicity, by summing said determined respective numbers of second data packets lost during the transmission from said network port to the respective user ports over an overall time interval reciprocal to said overall periodicity.

4. Method according to claim 3,
wherein said overall number of second data packets lost internally is determined for consecutive overall time intervals;
and wherein at least a fraction of an overall number of second data packets lost internally determined for a first time interval is taken into account for determining a corrected number of received second data packets of a second overall time interval, consecutive to said first overall time interval.

5. Method according to claim 2, furthermore comprising:
at said network port, indicating said corrected number of received second data packets to said far end network edge node; and
at said far end network edge node,
 determining a number of transmitted second data packets,
 receiving the indication of said corrected number of received second data packets, and
 determining a number of second data packets lost during the transmission from said far end network edge node to said user ports, by subtracting said indicated corrected number of received second data packets from said determined number of second data packets.

6. Method according to claim 2, furthermore comprising:
at said network port,
 receiving an indication of a number of second data packets transmitted by said far end network edge node, and
 determining a number of second data packets lost during the transmission from said far end network edge node to said user ports, by subtracting said corrected number of received second data packets from said indicated number of second data packets.

7. Method according to claim 1, furthermore comprising:
determining for each of said user ports said respective number of data packets lost internally during the transmission from the respective user port to said network port at a respective periodicity; and
determining the overall number of data packets lost internally during the transmission from said user ports to said network port at an overall periodicity, by summing said determined respective numbers of data packets lost internally during the transmission from the respective user ports to said network port an overall time interval reciprocal to said overall periodicity.

8. Method according to claim 1, furthermore comprising:
at said network port,
 receiving an indication of a number of data packets, containing said source address and said destination address, received by said far end network edge node, and
 determining a number of data packets lost during the transmission from said user ports to said far end network edge node, by subtracting said indicated number of data packets received by said far end network edge node from said corrected number of transmitted data packets.

9. Method according to claim 1, furthermore comprising:
at said far end network edge node,
 receiving the indication of said corrected number of transmitted data packets,
 determining a received number of data packets containing said source address and said destination address, and
 determining a number of data packets lost during the transmission from said user ports to said far end network edge node, by subtracting said determined received number of packets from said corrected number of transmitted data packets.

10. Network edge node, comprising:
at least one first line card comprising a group of at least two user ports, and at least one packet processor connected to said user ports;
at least one second line card comprising at least one network port and a packet processor connected to said network port; and
a switching device connecting said at least first and said at least second line cards;
wherein said at least one first line card is adapted to receive via said at least two user ports data packets, and wherein said at least one second line card is adapted to transmit data packets via said network port to a far end network edge node;
wherein said at least one packet processor of said at least first line card is adapted to add to data packets, which are received via said at least two user ports and which contain a same source address and a same destination address, an internal header element indicating the respective user port at which the data packet was received and also said network port;
wherein said switching device is configurable to switch said received data packets from said at least two user ports to said network port, using said added internal header elements;
wherein said packet processor of said second line card is adapted to determine a number of data packets, which are transmitted to said far end network edge node and which contain said same source address and said same destination address;
wherein said packet processors are adapted to determine for each of said at least two user ports a respective number of data packets lost internally during the transmission from the respective user port to said network port, using said added internal header elements;
and wherein said packet processor of said at least one second line card is adapted to determine a corrected number of transmitted data packets using said determined numbers of data packets lost internally during the transmission from the respective user port to said network port, wherein said corrected number of transmitted data packets is the sum of the determined number of said transmitted data packets and an overall number of data packets lost internally during the transmission from said user ports to said network port, and
to indicate said corrected number of transmitted data packets to said far end network edge node.

* * * * *